INVENTORS
NEALE A. ZELLMER
RICHARD H. FISH

BY Lippincott, Ralls & Hendricson
ATTORNEYS 3,328,716
Patented June 27, 1967

3,328,716

GAIN REGULATION CIRCUIT UTILIZING ELECTROCHEMICAL MEMORY MEANS IN VARIOLOSSER CONTROL CIRCUIT

Richard H. Fish, San Mateo, and Neale A. Zellmer, Belmont, Calif., assignors, by mesne assignments, to Automatic Electric Laboratories, Inc., Northlake, Ill., a corporation of Delaware Filed Sept. 3, 1963, Ser. No. 306,109
7 Claims. (Cl. 330—138)

This invention relates to a gain regulation circuit using a variolosser and an electrochemical analog memory device. More specifically, the invention provides a gain regulation circuit which maintains the amplitude of the output signal constant irrespective of changes in the amplitude of the pilot signal. Moreover, where the pilot signal cuts off entirely, the circuit remembers the correction signal provided in response to the pilot signal level prior to cutoff, and furnishes the same correction signal thereafter until such time as receipt of the pilot signal is resumed.

One of the problems encountered in the prior art with various types of regulator circuits in carrier system repeaters and terminals, for example, is their tendency to adjust for maximum gain upon pilot failure. Then, upon restoration of the pilot signal, the circuit must seek out the proper level, and often sets up undersirable signal regeneration, causing what has been termed "singing" in the process of re-establishing control.

The conventional approach for attempting to solve this problem has been to establish an analog memory, typically a capacitor or an electromechanical device, which takes over control of the variolosser circuit upon pilot failure. This memory holds the gain or loss of the regulator at the level it had prior to failure. Although long memory times were possible using capacitors in regulator circuits which employed high input impedance components, principally vacuum tubes, the use of low input impedance transistors drastically limits the attainable time constant with practical sized capacitors. Accordingly, attaining an appreciable memory time has become more difficult.

In turning to electromechanical devices as a substitute for capacitors in transistor circuits, other disadvantages were encountered. Mainly, these devices, which use a small electric motor to drive a multi-turn potentiometer, are inefficient, bulky, and slow in response to pilot level changes, particularly large changes.

This invention provides a gain regulation circuit which is highly suitable for transistor circuitry, and overcomes all of the above disadvantages of electromechanical devices. Briefly, the regulation circuit of this invention includes the following:

(a) A variolosser having two inputs, one for receiving the input signal and one for receiving a control signal used for gain regulation, (b) A rectifier to rectify the monitored A-C pilot signal to obtain a D-C input signal of amplitude proportional to the amplitude of the A-C pilot signal, and (c) An electrochemical analog memory having an input adapted to receive the D-C input signal from the rectifier, such memory adapted to compare the D-C input with a fixed reference signal, and to provide a control signal to the variolosser proportional to the difference between the D-C input signal and the reference signal; upon removal of the D-C input signal, the memory provides a control signal of substantially the same amplitude as it provided immediately prior to such removal, whereby this control signal modifies the gain in the variolosser to compensate for any changes in amplitude of the pilot signal.

The variolosser associated with the proposed analog memory may be any one of several configurations, but a Hall device makes an especially adaptable variolosser for this application. By the Hall effect, named for its discoverer, E. G. Hall, the output of the crystal of a Hall device is changed by the effect of a magnetic field on the charge carriers passing through. As used in this invention, the A-C input signal is passed through the crystal. A control current is passed through a coil located perpendicular to the path of current through the crystal. The amplitude of this control current is proportional to the difference between the amplitude of the A-C pilot signal passing through the crystal and a fixed reference signal. The change in the magnitude is of such polarity as to cause the Hall output voltage from the crystal to change in the direction opposite to the direction of the change in the amplitude of the A-C pilot signal. The Hall effect output voltage is therefore kept relatively constant by the compensating effect of the change in the amplitude of the control current upon the change in amplitude of the A-C pilot input signal.

The electrochemical analog memory may be one of many such devices, for example, a memistor, or one of a family of four-electrode devices called a "Solion" employing the redox reaction, manufactured by Texas Research and Electronic Corp. The operation of these devices will be explained in the detailed description to follow, making reference to the drawing, in which.

Figure 1:
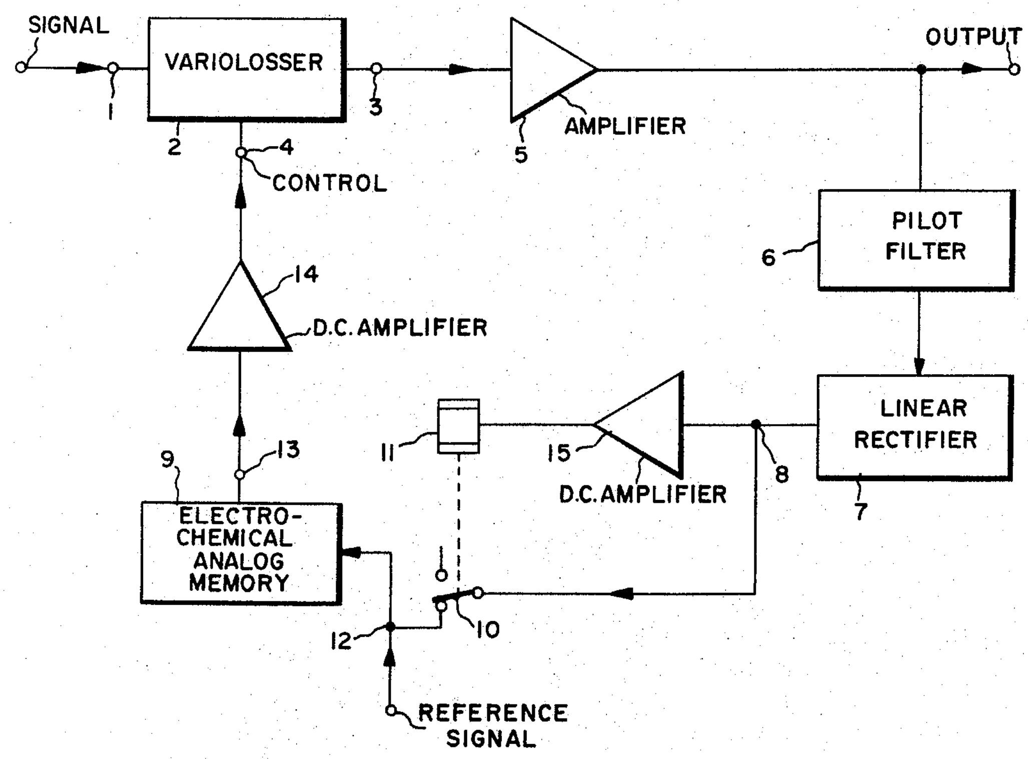
FIGURE 1 is a block diagram of the circuit of this invention.

Referring to FIGURE 1, the signal is passed to the input terminal 1 of variolosser 2. The variolosser may be a conventional type, using either directly or indirectly heated thermistors or varistors as the variable element. Conveniently, however, the variolosser may make use of a Hall device. A Hall device uses a crystal, preferably a semiconductor material, e.g. indium antimonide, mounted in a magnetic circuit. The crystal has input terminals 1 adapted to receive the input signal. The magnetic circuit, comprising a coil, has input terminals 4 adapted to receive the control signal. The coil is mounted in relation to the crystal so that the magnetic field resulting from current passing through the coil is perpendicular to the path of current through the crystal. Normally, the coil is rigidly mounted upon the crystal. The output voltage of the crystal is then the Hall effect voltage.

In somewhat more detail, the Hall effect is a result of the fact that the apparent perpendicular force exerted upon a current-carrying conductor by a magnetic field is actually not exerted on the conductor itself, but rather upon the charge carriers flowing within the conductor. Hall concluded that in view of this, there would be a greater accumulation of charge carriers on one side of a conductor than on the other, and that this would result in a difference in voltage potential between the two sides. Such a voltage arising from the magnetic deflection of moving charge carriers is known as the Hall voltage; it is proportional to the cross-product of the magnetic field applied (directly related to the magnitude of the current through the coil), and the input current to the crystal. Such a Hall voltage is received at the output terminal 3 of variolosser 2. Thus, the Hall voltage at output terminal 3 is related to the magnitudes of both the input signal at terminal 1, and the control signal at terminal 4. As will be explained later, this voltage is relatively constant.

Because of inherent losses in the variolosser itself, it is preferable to amplify the gain-controlled output signal using a typical broadband amplifier 5. To achieve the gain regulation, an appropriate signal, for example an arbitrarily assigned pilot frequency signal, is monitored. This pilot signal is normally included along with the transmitted signals for this purpose. Although the levels of various other frequencies in the transmitted signal may vary, the level of the pilot signal should remain constant except for transmission losses or gains. These changes are therefore compensated by comparing the pilot signal to a standard fixed reference level, and modifying the level of the input signal in proportion to the detected difference.

Filter 6 is used to pick off the A-C pilot signal frequency from the remainder of the signal. Linear rectifier 7 then rectifies the A-C pilot signal to provide at its output terminal 8 a D-C input signal to electrochemical analog memory device 9 proportional to the pilot signal level. The D-C signal at terminal 8 is passed through arm 10 of relay 11 to terminal 12 of memory 9.

Electrochemical analog memory 9 may, for example, be a Solion, as mentioned above. The Solion uses a chemical reaction in which oxidation and reduction occur simultaneously, usually referred to as a redox reaction. Two inert electrodes are immersed in an electrolyte containing both oxidized and reduced species of an ion. The system is completely reversible in that oxidation can occur at either electrode while an equivalent amount of the same element is reduced at the opposite electrode. In a Solion, the reacting element is typically iodine.

The reference signal of fixed voltage and the D-C input signal from rectifier 7 are fed into input terminal 12 of the Solion. If the reference signal is greater in magnitude than the D-C input signal, the resultant input signal to the Solion will be a D-C current in one direction, but if the opposite relationship exists, the input signal to the Solion will be in the opposite direction. An input current in one direction will transfer iodine from one reservoir in the Solion to the other reservoir, termed the "integral compartment." An input current in the other direction will transfer iodine in the reverse direction. The amount of iodine so transferred is proportional to the integral of the input current. Accordingly, where there is no input current (indicating that the pilot signal is equal to the reference), no transfer of iodine occurs.

The Solion provides an output control current to terminal 13 which is always proportional to the amount of iodine in the integral compartment. Thus, the output control current is the integral of the input current. The Solion therefore in effect integrates the error current, i.e., the difference between the amplitude of the pilot and reference signals. The control current output at terminal 13 represents this integral.

The control current from terminal 13 is passed through D-C amplifier 14 into the control input to the variolosser. Realizing that this control current is proportional to the integral of the error current and that too high an output signal results in an error current in one direction, while too low an output results in error current in the opposite direction, it can be seen that if the control current is made to decrease with positive error current, it will increase with negative error current. As the Hall voltage is proportional to the product of the input signal times the control current then a high output tends to decrease itself and a low output tends to increase itself. As the error current reduces to zero there will be no change in the Solion's output and the output signal will remain constant until some change external to the entire circuit restarts the adjustment cycle.

Iodine cannot flow between the reservoir and the integral compartment of a Solion in the absence of an input signal. Thus, when the pilot signal cuts out, resulting in no D-C input signal from rectifier 7, and thus no current signal into the Solion, the iodine in the integral compartment will remain at the same level as it was immediately prior to such cutoff. It is apparent that this will result in the maintenance of a constant control current at terminal 13 until the pilot signal is resumed. This feature of the Solion provides the "memory." Thus, when pilot transmission is resumed, the variolosser will have approximately the same loss as it did when the interruption occurred. This prevents the "singing" which commonly occurred when the variolosser was allowed to drift to the maximum gain level upon pilot interruption, as occurred in the prior art.

Figure 2:
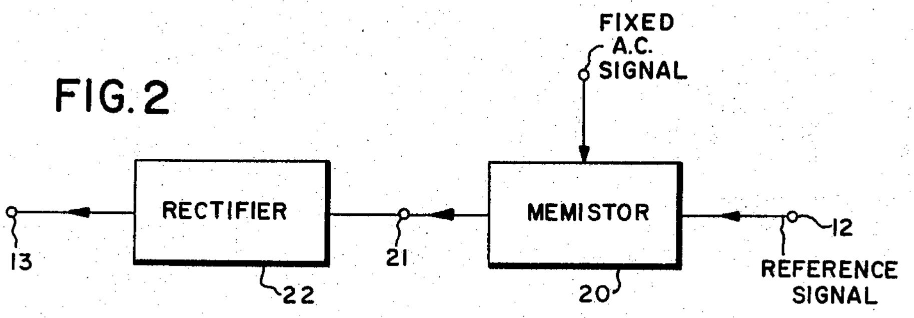
FIGURE 2 is a block diagram of a memistor circuit.

It is important, in order to avoid drift in the control current from the Solion during pilot interruption, to insure that no input current reaches input terminal 12 during the interruption. Although this may be the case normally, sometimes very weak interfering signals may cause a D-C leakage current to flow from rectifier 7. To keep this current from effecting the Solion, a relay 11 is used. Upon pilot failure, the output level from D-C amplifier 15 is so weak as to permit bar 10 of relay 11 to release and break contact between the rectifier 7 and input terminal 12 to the Solion. When the pilot signal resumes, relay 11 returns bar 10 to its normal position, and resumes D-C input signal current flow to the Solion providing that the pilot and reference differ at that time.

Where a memistor circuit is used as the electrochemical analog memory, the operation of the memistor circuit can be seen from FIGURE 2. The numbers of the corresponding terminals shown in FIGURE 1 have been retained in FIGURE 2. The D-C input signal from the rectifier and the reference signal both appear, as before, at terminal 12. A fixed A-C signal is fed to memistor 20, as shown. The memistor is in effect an A-C resistance whose value is affected by the signal at input terminal 12. With no signal at terminal 12 (D-C input signal equal to reference), the resistance of the memistor is such to provide an A-C output signal at terminal 21 which, when rectified by rectifier 22 and amplified by D-C amplifier 14 (FIGURE 1), will cause variolosser 2 (FIGURE 1) to maintain a zero gain.

When the pilot level increases above the nominal operating level, a D-C current flows into terminal 12. This current causes the A-C resistance of memistor 20 to decrease, thus increasing the control current at terminal 13 since the fixed A-C input signal does not change. With a decreasing pilot level, the opposite occurs, i.e., the control current to terminal 13 is decreased. When used with a memistor, therefore, the variolosser is the type which decreases its loss in response to a decreasing control current, thus increasing the level of the pilot signal until equilibrium is again established, as discussed above in the embodiment using the Solion. The opposite sequence then occurs with an increasing pilot level.

In the event of pilot failure, the A-C resistance of the memistor must remain constant. This will happen if no D-C input signal appears at terminal 12. Again, referring to FIGURE 1, relay 11 will break contact between rectifier 7 and terminal 12 to insure that no D-C input current reaches the memistor. Memistors are known to maintain a constant resistance for periods up to a week if no input signal is applied. Thus, where long pilot failures are likely to be encountered, memistors are preferable analog memories for this invention.

It must be understood that this invention is not restricted by choice of a particular variolosser, although a Hall device is very well adapted for this purpose. Similarly, the memistor and Solion are but examples of a type of electrochemical analog memory device, of which more types are available or to become available in the near future. For example, adaptive components, such as described in paper ASD–TDR–62–1012, published by Solid-State Electronics Laboratory, Stanford Electronics Laboratories, Stanford University, Palo Alto, Calif., may also to be used. In view of the many variations, including but not limited to those mentioned above, which may be made in the specific embodiments of the invention described herein, the only limitations to be placed upon the scope of this invention are those expressed in the claims which follow.

What is claimed is:

1. A gain regulation circuit having input and output terminals operating upon an input signal containing an A-C pilot signal, comprising:

(a) a variolosser having two inputs and an output, one for receiving said input signal and one for receiving a control signal used for gain regulation, said variolosser being connected in series between input and output terminals of the regulator circuit, (b) means for rectifying said A-C pilot signal to obtain a D-C input signal of amplitude proportional to the amplitude of said A-C pilot signal, and (c) an electrochemical analog memory having an input adapted to receive said D-C input signal, said memory adapted to compare said D-C input signal with a fixed reference signal, and to provide said control signal to said variolosser proportional to the difference between said D-C input signal and said reference signal, and said memory, upon removal of said D-C input signal, providing a control signal of substantially the same amplitude as it provided immediately prior to said removal, whereby said control signal modifies the gain in said variolosser to compensate for any change in amplitude of said pilot signal.

2. The circuit of claim 1 further defined by said variolosser being a Hall device.

3. The circuit of claim 1 further defined by said electrochemical analog memory being a Solion.

4. The circuit of claim 1 further defined by said electrochemical analog memory being a memistor circuit.

5. A gain regulation circuit having input and output terminals with an amplifier therebetween and operating upon an input signal containing an A-C pilot signal, comprising:

(a) a variolosser having a first input connected to said input terminal, an output connected to said amplifier, and a second input for receiving a control signal used for gain regulation;

(b) means for rectifying said A-C pilot signal to obtain a D-C input signal of amplitude proportional to the amplitude of said A-C pilot signal;

(c) an electrochemical analog memory unit having an input adapted to receive said D-C input signal, said memory unit being adapted to compare said D-C input signal with a fixed reference signal and to provide said control signal to said variolosser proportional to the difference between said D-C input signal and said reference signal, and said memory, upon removal of said D-C input signal, providing a control signal of substantially the same amplitude as it provided immediately prior to said removal, wherein said control signal modifies the gain in said variolosser to compensate for any change in amplitude of said pilot signal; and (d) means for (1) removing said D-C input signal from said input of said electrochemical analog memory upon failure of said pilot signal, and (2) restoring said D-C input signal to said input of said electrochemical analog memory upon restoration of said pilot signal.

6. The circuit of claim 5 further defined by said means for removing and restoring said D-C input signal being a relay having a holding coil energized by said D-C input signal and contacts operated by said coil.

7. A gain regulation circuit operating upon a broadband input signal containing an A-C pilot signal, comprising:

(a) a variolosser having two inputs, one for receiving said input signal and one for receiving a control signal used for gain regulation, (b) means for filtering said A-C pilot signal from said broadband input signal, (c) means for rectifying said A-C pilot signal to obtain a D-C input signal of amplitude proportional to the amplitude of said A-C pilot signal, (d) an electrochemical analog memory having an input adapted to receive said D-C input signal, said memory adapted to compare said D-C input signal with a fixed reference signal, and to provide said control signal to said variolosser proportional to the difference between said D-C input signal and said reference signal, and said memory, upon removal of said D-C input signal, providing a control signal of substantially the same amplitude as it provided immediately prior to said removal, whereby said control signal modifies the gain in said variolosser to compensate for the change in amplitude of said pilot signal, and (e) means for (1) removing said D-C input signal from said input of said electrochemical analog memory upon failure of said pilot sginal, and (2) restoring said D-C input signal to said input of said electrochemical analog memory upon restoration of said pilot signal.

References Cited

UNITED STATES PATENTS

| | | | |
|---|---|---|---|
| 1,738,000 | 12/1929 | Green | 333—14 |
| 2,116,600 | 5/1938 | Fisher et al. | 333—15 |
| 2,920,291 | 1/1960 | Brundage | 333—15 |
| 2,921,267 | 1/1960 | Thomas | 330—144 |
| 3,086,179 | 4/1963 | Powers | 333—14 |
| 3,112,461 | 11/1963 | Jager et al. | 333—14 |

HERMAN KARL SAALBACH, *Primary Examiner.*

C. BARAFF, *Assistant Examiner.*